(12) United States Patent
Beck et al.

(10) Patent No.: US 6,530,213 B2
(45) Date of Patent: Mar. 11, 2003

(54) METHOD AND APPARATUS FOR IGNITION DETECTION

(75) Inventors: Philip Beck, Conifer, CO (US); Scot K. Anderson, Conifer, CO (US); Gerald P. Klein, Littleton, CO (US); Donald J. Thielman, Bailey, CO (US); Daniel L. Scheld, Littleton, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/153,155

(22) Filed: May 22, 2002

(65) Prior Publication Data

US 2003/0010015 A1 Jan. 16, 2003

Related U.S. Application Data

(60) Provisional application No. 60/292,712, filed on May 22, 2001.

(51) Int. Cl.[7] .................................................. F02K 9/38
(52) U.S. Cl. .............................. 60/204; 60/240; 60/223
(58) Field of Search ........................... 60/204, 803, 240, 60/243, 223

(56) References Cited

U.S. PATENT DOCUMENTS

| 4,934,137 A | * | 6/1990 | MacKay ...................... 60/803 |
| 5,671,914 A | * | 9/1997 | Kalkhoran et al. ........... 257/77 |
| 5,726,440 A | * | 3/1998 | Kalkhoran et al. ...... 250/214.1 |
| 5,748,090 A | | 5/1998 | Borg et al. ................. 340/578 |
| 5,936,188 A | | 8/1999 | Atkinson .................... 102/380 |
| 5,937,077 A | | 8/1999 | Chan et al. ................. 382/100 |
| 6,000,340 A | | 12/1999 | Small ......................... 102/380 |

* cited by examiner

Primary Examiner—Ehud Gartenberg
(74) Attorney, Agent, or Firm—Marsh Fischmann & Breyfogle LLP

(57) ABSTRACT

The present invention is directed to methods and apparatus of detecting engine ignition. The invention generally includes a camera assembly to detect electromagnetic spectra, and a control assembly operatively interconnected with the camera assembly to monitor and evaluate the spectral data collected by the camera assembly. The control assembly is generally programmed with first and second predetermined thresholds associated with respective first and second electromagnetic spectra, and a time threshold at least generally associated with a first time parameter in which at least one of the first and second predetermined thresholds should be reached.

51 Claims, 7 Drawing Sheets

METHOD AND APPARATUS FOR IGNITION DETECTION

RELATED APPLICATIONS

This application claims priority under 35 USC 119(e) to U.S. Provisional Application No. 60/292,712 entitled "Ignition Detection System" that was filed on May 22, 2001, which is incorporated herein by reference in its entirety.

FIELD OF THE INVENTION

The present invention generally relates to ignition systems and, more particularly, to an ignition detection system for use prior to and/or during a lift-off/take-off sequence of a rocket powered spacecraft/aircraft.

BACKGROUND OF THE INVENTION

Propulsion systems and/or rocket engines have traditionally been utilized in a variety of applications ranging from space shuttle and rocket missions to missile launching applications. These propulsion systems and/or rocket engines ideally possess safe and dependable systems for controlling their ignitions and accompanying launches. In particular, safe and reliable engine ignition is particularly important in spacecraft applications involving the launch of manned spacecrafts such as liquid fueled rockets and space shuttles.

These propulsion systems and/or rocket engines generally have a combustion chamber that releases an exhaust plume from the exhaust nozzle(s) of each engine. These exhaust plumes generally include heat and flames, among other distinguishing features. A failure to properly ignite the fuel utilized for providing a pilot light and/or the main fuel in the combustion chamber may result in one or more engines malfunctioning and the spacecraft lacking the lift needed for launch, potentially resulting in the loss of lives and/or damage to the spacecraft and/or launch pad. Further, an incorrect or failed ignition may be symptomatic of one or both fuel and oxidizer from the spacecraft being dumped onto the launch pad. Any subsequent ignition of this fuel/oxidizer could potentially result in a catastrophic event.

One conventional procedure of engine ignition detection includes stretching wires across each engine exhaust nozzle. The plume of exhaust is intended to burn away and generally completely sever each of the wires, thus indicating that each of the engines are sufficiently ignited. Potential problems with this type of an ignition detection system include, but are not limited to, wind breaking the wires that span across the exhaust nozzle(s) indicating successful ignition before launch is even attempted. This would yield a potentially "false positive" signal if ignition did not in fact occur. This type of ignition detection system can also result in "false abort" signals as well. That is, there may be instances where even a proper ignition may fail to completely burn through or otherwise sever the wires. This false "failed" ignition signal can cause the launch of an entirely satisfactory rocket to be aborted.

SUMMARY OF THE INVENTION

The present invention is generally directed to the detection of engine ignition. More specifically, the methods and apparatus of the present invention are generally directed to the detection of liquid-fueled rocket engine ignition of a spacecraft/aircraft. A preferred application of the present invention may be in the use of ignition detection systems for launch vehicles.

A first aspect of the present invention is embodied in a method for operating an engine (e.g., a liquid-fueled rocket engine). The method generally includes initiating an ignition sequence that includes at least a first ignition stage and a second ignition stage for the engine. The method further includes monitoring first ignition stage electromagnetic spectra and second ignition stage electromagnetic spectra at least during a time corresponding with the first and second ignition stages, respectively. A first relay is generally activated if the first ignition stage electromagnetic spectra reach(es) a first predetermined threshold within a first predetermined timeframe. Correspondingly, a second relay is generally activated if the second ignition stage electromagnetic spectra reach(es) a second predetermined threshold within a second predetermined timeframe. "Reaches", in relation to the first and second predetermined thresholds, encompasses meeting a certain value, exceeding a certain value, or both. In the event that either relay is not activated within the corresponding predetermined timeframe, the ignition sequence is generally terminated.

Various refinements exist of the features noted in relation to the subject first aspect of the present invention. Further features may also be incorporated in the subject first aspect of the present invention as well. These refinements and additional features may exist individually or in any combination. For instance, the first ignition stage electromagnetic spectra may include ultraviolet, visible, and/or infrared light rays but may be most intense in the visible. Accordingly, this first aspect may include monitoring electromagnetic spectra within a wavelength range of about 400 nm (visible blue light) to about 700 nm (visible red light). The first ignition stage electromagnetic spectra may thereby encompass a range of wavelengths, although the first ignition stage electromagnetic spectra may also be a single, individual wavelength. The second ignition stage electromagnetic spectra may include ultraviolet, visible, and/or infrared light rays but may be most intense in the infrared. Thus, this first aspect of the present invention may include monitoring electromagnetic spectra within a wavelength range of about $7.0 \times 10^2$ nm up to about $3.0 \times 10^5$ nm, and in some embodiments, a wavelength range of anywhere between $7.0 \times 10^2$ nm and $7.8 \times 10^2$ nm up to about $1.0 \times 10^5$ nm. As with the first ignition stage electromagnetic spectra, this second ignition stage electromagnetic spectra may also encompass a range of wavelengths or may merely include a single, individual wavelength.

Generally, one or both of the first and second ignition stage electromagnetic spectra in the case of the first aspect may be emitted by an ignition of at least one of hypergolic fuel and kerosene. In one embodiment, a mixture of hypergolic fuel and liquid oxygen is utilized in the first ignition stage, while a mixture of liquid oxygen and kerosene is utilized in the second ignition stage. In this case, the first ignition stage electromagnetic spectra may be visible electromagnetic spectra that are monitored for purposes of the first ignition stage, while the second ignition stage electromagnetic spectra may be infrared electromagnetic spectra that are monitored for purposes of the second ignition stage. "Hypergol" (also known as hypergolic fuel) refers to a liquid fuel or propellant that generally ignites in a substantially spontaneous fashion upon contact with an oxidizer. An "oxidizer" generally includes oxygen and/or any compound that spontaneously evolves oxygen either at ambient temperature and/or upon exposure to heat. These oxidizers (or oxidizing materials) generally react vigorously (i.e., can cause and/or support ignition/combustion) when mixed with reducing materials (such as liquid hydrocarbons, hypergolic fuels, cellulose-based organic compounds, and/or other appropriate organic compounds).

First and second ignition stage electromagnetic spectra that generally are associated with the first and second ignition stages of the ignition sequence may be monitored in this first aspect of the invention. In this first aspect, the process of monitoring electromagnetic spectra can include using spectrometers, radiometers, and the like, some of which may optionally be equipped with filters. In one embodiment of the first aspect, photons of the first and second ignition stage electromagnetic spectra are converted to electrical signals (i.e., photo-electrons), and these electrical signals are then monitored for the first and second predetermined thresholds (e.g., first and second voltage thresholds, respectively) as well as if/when in the timeframe of the launch sequence these thresholds are reached. These electrical signals may be amplified (e.g., using an appropriate amplifier) to improve one or more aspects associated with the monitoring of the same to identify the existence of first and and/or second ignition stage electromagnetic spectra that reach the corresponding predetermined thresholds.

As previously mentioned, the first relay can be activated upon the first ignition stage electromagnetic spectra meeting or exceeding a first predetermined threshold at a first predetermined time slot in the ignition sequence in the case of the first aspect. In one embodiment of the first aspect in which the first ignition stage electromagnetic spectra that are monitored include visible light (e.g., electromagnetic spectra having wavelengths between about 400 nm and about 700 nm), the first predetermined threshold may be established within a range of about 1000 arbitrary power units above a background. Herein, "background" is generally determined by looking at an "empty, featureless" sky (i.e., sky generally having no clouds or sun in the field of view) and by making a measurement of the brightness of the sky. This measurement is generally defined as the background. Accordingly, the particular threshold may be chosen to be up to 1000 times brighter than the background measurement. Once the monitored visible light meets or exceeds the first predetermined threshold and occurs within the first predetermined timeframe, a first relay can be activated to indicate that the monitored visible electromagnetic spectra are at an appropriate level and occurred at an appropriate time (i.e., indicate a proper ignition of the subject fuel) for lift-off/takeoff. Similarly, the second relay can be activated upon the second ignition stage electromagnetic spectra meeting or exceeding a second predetermined threshold and occurring in within the second predetermined timeframe. Continuing with the above-noted embodiment where the second ignition stage electromagnetic spectra that are monitored include infrared light (e.g., electromagnetic spectra having wavelengths between about $1.0 \times 10^3$ nm and about $1.0 \times 10^5$ nm), the second predetermined threshold may be established within a range of about 1000 arbitrary power units above background. Once the monitored infrared light meets or exceeds that second predetermined threshold, and occurs within the second predetermined time slot, a second relay can be activated. In one embodiment, a "go" signal may now be generated to indicate that the monitored first and second ignition stage electromagnetic spectra are at appropriate levels and have occurred at the appropriate times (i.e., indicate a proper ignition of the particular fuel(s)) for liftoff/takeoff.

Preferably, with regard to this first aspect of the invention, both the first and second relays must be activated to proceed with the ignition sequence. In other words, activation of both the first and second relays preferably indicates that engine conditions are appropriate to continue with the ignition sequence. This first aspect not only generally requires that the first and second relays be activated to proceed with the ignition sequence, but that both the first and second relays are activated within the corresponding predetermined timeframes of the launch sequence. In some embodiments, the first and second relays may be required to be activated within a predetermined time of each other. Exactly where in the launch sequence the particular stage one and stage two ignition timeframes occur may be dependent upon factors such as, but not limited to, the type of rocket engine utilized. These first and second predetermined timeframes may be determined by observation/analysis of, for example, engine hot fire tests and/or test launches. As an example of this first aspect, the first predetermined timeframe of the first ignition stage spectra for Rocketdyne MA-5 engines can generally be established in the ignition sequence to be within a range of about T−2.79 seconds to about T−3.40 seconds. Herein, "T-x seconds" generally refers to amount of time "x" prior to lift-off/takeoff (T) of the flight vehicle. So, for example, "T−2.79" seconds generally refers to about 2.79 seconds prior to the time the launch vehicle is supposed to liftoff/takeoff. Continuing with the example, the predetermined time of the second ignition stage spectra can generally be established to be within a range of about T−1.59 seconds to about T−2.20 seconds. In other words, the amount of time that passes between the first and second relays being activated, at least with regard to Rocketdyne MA-5 engines, may generally be no more than about 1.81 seconds, or else the ignition sequence may be aborted. Thus, the first and second relays being activated within the predetermined timeframes associated with the first aspect generally indicates that the ignition sequence may proceed. In one embodiment, an ignition shutdown signal may be issued in response to at least one of the first and second ignition stage electromagnetic spectra not reaching (i.e., meeting or exceeding) the respective first and second predetermined thresholds, and/or not occurring at or within the corresponding first and/or second predetermined timeframes. In other words, if one or both the first and second relays are not activated or activated at the wrong time, an "abort" signal of sorts may be issued. In another embodiment, the activation of the first and second relays within the required predetermined time of each other may be utilized to initiate a "go" signal for proceeding with the ignition sequence.

The first aspect of the invention can be utilized to detect ignition of engines that can be found in various types of what may be characterized as flight vehicles such as launch vehicles, airplanes, rockets, missiles, space shuttles, and satellites. In one embodiment of the first aspect, direct physical contact between ignition detection equipment and the aircraft is not required, such that there is not contact between any ignition detection equipment and the aircraft. In other words, the equipment that is utilized to carry out the process of ignition detection in this embodiment is generally separated from and does not interface with any portion of the aircraft. Generally, each of the various features discussed herein in relation to one or more of the described aspects of the present invention may be utilized by this first aspect of the present invention as well, alone or in any combination.

A second aspect of the invention is embodied in a launch system that includes an ignition detection system and a launch vehicle having at least one engine. The ignition detection system of this second aspect includes a camera assembly (such as a spectrometer or radiometer), a fiber optic input cable, and a control assembly. The camera assembly generally has an input area and an output area. The fiber optic input cable generally has an attachment end optically connected to the input area of the camera assembly and a hot end disposed opposite the attachment end. Accordingly, the hot end of the fiber optic input cable is generally disposed at least within an optically effective distance of the engine. Herein, an "optically effective distance" refers to a distance which allows detection of electromagnetic spectra representative of an ignition of the engine. Ideally, both the camera assembly and the fiber optic input cable are free from direct contact with the launch vehicle. In other words, the camera assembly and the fiber optic input cable are preferably separated from and avoid interfacing with any portion of the launch vehicle, and more particularly the engine. The camera assembly is generally operatively interconnected (e.g., via a copper wire) with the control assembly so that signals indicative of the electromagnetic spectra may be passed/conveyed between the camera assembly and the control assembly.

Various refinements exist of the features noted in relation to the subject second aspect of the present invention. Further features may also be incorporated in this second aspect of the present invention as well. These refinements and additional features may exist individually or in any combination. For instance, the ignition detection system can be mounted on a launch pad. In one embodiment of the second aspect, the ignition detection system (or at least the control assembly and the camera assembly) is designed and configured to effectively avoid structural damage during provision of the ignition detection function, thus making the ignition detection system of the second aspect reusable for detection of multiple, spaced-in-time ignitions for multiple launch vehicles (e.g., from multiple launches). For example, in the case of an explosive missile, the ignition detection system associated with the second aspect would not be a component of that missile. As another example, in the case of booster rocket for propelling an appropriate spacecraft into outer space, the ignition detection system associated with the second aspect would not be integral with the booster rocket, thus avoiding loss of and/or significant damage to the ignition detection system after the booster rocket has served its purpose and been dissociated from the spacecraft it propelled into outer space.

The control assembly (e.g., a dual setpoint controller of the control assembly) of the ignition detection system utilized by this second aspect may be programmed with a first predetermined threshold that is associated with first electromagnetic spectra and a second predetermined threshold that is associated with second electromagnetic spectra. Moreover, the control assembly (e.g., a programmable logic controller of the control assembly) generally may be programmed with one or more time thresholds corresponding to an acceptable timeframe for the first ignition stage, an acceptable timeframe for the second ignition stage, and/or an acceptable time duration between the camera assembly detecting that the first predetermined threshold and the second predetermined threshold have been reached. As such, the various features discussed above in relation to the first aspect may be implemented in this second aspect as well.

The camera assembly utilized by the second aspect can include a variety of components. Generally, any camera assembly capable of monitoring and/or detecting the electromagnetic spectra described herein may be appropriate for use in the ignition detection system associated with the second aspect. In one embodiment of the subject second aspect, the camera assembly may include at least one camera having one or more of: 1) a filter which substantially allows only specified wavelengths of electromagnetic spectra to pass through the filter; 2) a focusing optic which at least partially condenses the electromagnetic spectra; and 3) a signal amplifier for intensifying photo-electron signals corresponding to the electromagnetic spectra. In another embodiment, the camera assembly associated with the second aspect includes first and second cameras. In this case, the first camera may generally detect first electromagnetic spectra (e.g., a range of wavelengths or a single, individual wavelength), and the second camera may generally detect second electromagnetic spectra (e.g., a range of wavelengths or a single, individual wavelength). In a preferred embodiment of the second aspect, the first camera can generally detect visible light wavelengths, and the second camera can generally detect infrared light wavelengths. In the case where there are first and second cameras, the fiber optic input cable can have a first fiber optic operatively interconnected with a first input of the first camera for taking in spectral data and/or conveying it to the first camera. Similarly, the fiber optic input cable can have a second fiber optic operatively interconnected with a second input of the second camera for taking in spectral data and/or conveying it to the second camera.

The hot end of the fiber optic input cable associated with the ignition detection system utilized by the second aspect is generally disposed at least within an optically effective distance of the ignited fuel (usually, but not limited to, the exhaust plume or the ignited fuel in the combustion chamber) of the engine. In one embodiment, this optically effective distance is generally no more than about 10 feet. Some embodiments have the hot end of the fiber optic input cable actually positioned within (but not in contact with) an exhaust nozzle of the engine. Other embodiments have the hot end of the fiber optic input cable positioned within (but not in contact with) a combustion chamber of the engine. In one embodiment, the hot end of the fiber optic input cable may be separated from direct, physical contact with the launch vehicle by a distance of about 2 inches up to about 10 feet.

The hot end of the fiber optic input cable of the second aspect may be confined in a protective housing. An exemplary protective housing may be a steel receptacle having a window. Ideally, the window of such a protective housing is designed and configured to enable electromagnetic spectra to reach the hot end of the fiber optic input cable. Exemplary window materials generally include, but are not limited to, glass, quartz, sapphire, and zirconia. Other appropriate protective housings may be utilized as long as they do not significantly inhibit the hot end of the fiber optic input cable from receiving and/or conveying spectral data relating to the subject engine ignition. Generally, each of the various features discussed herein in relation to one or more of the described aspects of the present invention may be utilized by this second aspect of the present invention as well, alone or in any combination.

A third aspect of the present invention is embodied in a launch system having a camera assembly, a control assembly, and a launch vehicle that includes at least one engine. The camera assembly of the launch system generally functions to at least assist in detecting electromagnetic spectra. The camera assembly generally includes a fiber optic input cable which can have an attachment end optically connected to the camera assembly and a hot end positioned opposite the attachment end and disposable at least generally toward the engine(s). The control assembly may be operatively interconnected with the camera assembly. This control assembly is at least generally programmed with a first predetermined threshold associated with first electromagnetic spectra and a second predetermined threshold associated with second electromagnetic spectra. In addition, the control assembly is at least generally programmed with a first time threshold associated with a first time parameter in which at least one of the first and second thresholds should be reached.

Various refinements exist of the features noted in relation to the subject third aspect of the present invention as well. Further features may also be incorporated in the subject third aspect of the present invention. These refinements and additional features may exist individually or in any combination. The first electromagnetic spectra may include a wavelength range of about 200 nm to about 700 nm. Similarly, the second electromagnetic spectra may include a wavelength range of about 700 nm to about 300,000 nm. In some embodiments, one or both the first and second electromagnetic spectra may include a single, individual wavelength. It may, however, be appropriate that some embodiments of the subject third aspect have one or both first and second electromagnetic spectra outside the above-disclosed ranges.

The first time threshold, in the case of the third aspect, may generally refer to an acceptable time duration between when the first and second predetermined thresholds should be reached. In one embodiment of the third aspect, this acceptable time duration may range from about 100 milliseconds up to about 3 seconds. In another embodiment, this acceptable time duration may be no more than about 10 milliseconds. However, it may be appropriate that yet other embodiments of the subject third aspect may exhibit an appropriate first time threshold outside those disclosed above. Then again, the first time threshold of the third aspect may generally refer to an appropriate window in time, with respect to lift-off/take-off (i.e., T–0) of the launch vehicle, in which the first electromagnetic spectra may be monitored to determine if the first predetermined threshold has been reached. Additionally or alternatively, the first time threshold of the third aspect may generally refer to an appropriate window in time, again with respect to lift-off/take-off (i.e., T–0) of the launch vehicle, in which the second electromagnetic spectra may be monitored to determine if the second predetermined threshold has been reached. With regard to the first time threshold, the appropriate window(s) in time for one or both the first and second predetermined thresholds may generally depend upon, amongst other factors, the type of engine(s) utilized in the launch vehicle. Generally, each of the various features discussed herein in relation to any aspect of the present invention may be utilized by this third aspect of the present invention as well, alone or in any combination.

A fourth aspect of the present invention is embodied in a method of operating an engine (e.g., a rocket engine). The method generally includes initiating an ignition sequence that includes at least a first ignition stage and a second ignition stage for an engine. The method further includes monitoring first and second ignition stage electromagnetic spectra at least during a time corresponding with the first and second ignition stages, respectively. The first ignition stage electromagnetic spectra is generally monitored to determine if it reaches a first predetermined threshold. Correspondingly, the second ignition stage electromagnetic spectra is generally monitored to determine if it reaches a second predetermined threshold. "Reaches" in relation to the first and second predetermined thresholds again generally encompasses meeting a certain value, exceeding a certain value, or both. In the event that the second predetermined threshold is not reached within a predetermined time of the first predetermined threshold being reached, the ignition sequence is generally terminated.

Various refinements exist of the features noted in relation to the subject fourth aspect of the present invention. Further features may also be incorporated in the subject fourth aspect of the present invention as well. These refinements and additional features may exist individually or in any combination. Generally, the various features discussed above in relation to any of the aspects of the present invention may be utilized by this fourth aspect, individually or in any combination.

A fifth aspect of the present invention relates to a system and method for checking the health of an ignition detection system. Herein, the "health" of a system generally refers to whether or not the system is functioning appropriately. So, checking the health of the ignition detection system may include (but is not limited to) determining if optical data is being appropriately conveyed through the ignition detection system, and determining if the optical data is being appropriately and/or accurately converted to electrical signals indicative of the optical data. The health check system of this fifth aspect generally includes a health check panel that is electrically interconnected with a test lamp assembly. This test lamp assembly generally includes a first lamp and a test fiber optic cable that is optically interconnected with the test lamp assembly and that has a hot end opposite an attachment end that is optically interconnected with the test lamp assembly for conveying electromagnetic spectra emitted from the first lamp toward an associated ignition detection system.

Various refinements exist of the features noted in relation to the subject fifth aspect of the present invention. Further features may also be incorporated in the subject fifth aspect of the present invention as well. These refinements and additional features may exist individually or in any combination. For example, in one embodiment of the fifth aspect, the health check system may be an integral component of an associated ignition detection system. However, in another embodiment, the health check system may be separate and distinct from an associated ignition detection system. In any event, the health check panel of the health check system may be electrically interconnected (i.e., capable of sending/receiving electrical signals between first and second components) with the test lamp assembly via a wire that is capable of conducting electrical signals. This wire may be made up of any appropriate conducting material (e.g., a metal such as copper) and may have an insulating material (e.g., rubber or plastic) surrounding at least portions of the conducting material.

In the cases this fifth aspect, the first lamp of the test lamp assembly, generally upon being activated due to an electrical signal from the health check panel, may emit/give off light rays (i.e., electromagnetic spectra) that coincide with an above-described predetermined threshold (e.g., first and/or second predetermined thresholds) of an associated ignition detection system. In other words, upon illumination of this first lamp of the test lamp assembly, the health check system may generally provide electromagnetic spectra indicative of at least a stage of an appropriate engine ignition. However, the first lamp of another embodiment of the fifth aspect may emit photons that may not be indicative of at least a stage of an appropriate engine ignition.

The test lamp assembly of fifth aspect of the present invention may also include a second lamp. Generally upon being activated due to an electrical signal from the health check panel, the second lamp may emit/give off light rays (i.e., electromagnetic spectra) that coincide with another of the above-described predetermined thresholds (e.g., first and/or second predetermined thresholds) of an associated ignition detection system. In other words, upon illumination of this second lamp of the test lamp assembly, the health check system may generally provide electromagnetic spectra indicative of at least a stage of a positive/desired engine ignition. Accordingly, one embodiment of the fifth aspect may exhibit the first test lamp emitting electromagnetic spectra indicative of a first predetermined threshold of the associated ignition detection system, and the second lamp emitting electromagnetic spectra indicative of the second predetermined threshold of the associated ignition detection system. As with the first lamp of the health check system of the fifth aspect, the second lamp of another embodiment may emit photons that may not be indicative of at least a stage of an appropriate engine ignition. In any event, another embodiments of the fifth aspect of the present invention may include more than 2 test lamps (e.g., 3,4,or 5 test lamps).

Accordingly, a method of using a health check system of the fifth aspect may generally including issuing one or more electrical signals from the health check panel to the test lamp assembly. In response to receiving the electrical signal(s), the test lamp assembly may issue one or more optical signals (i.e., light) that travel away from the test lamp assembly toward the associated ignition detection system. With regard to these optical signals, the test lamp assembly may emit (i.e., give off) optical signals within a desired first range that is to be detected by the ignition detection system. In one embodiment, the test lamp assembly may emit electromagnetic spectra that reach a first predetermined threshold of the ignition detection system. The test lamp assembly may also emit electromagnetic spectra within a desired second range that is to be detected by the ignition detection system. Thus, the test lamp assembly may generally emit electromagnetic spectra that reach a second predetermined threshold of the ignition detection system. In one embodiment, the health check system may be configured to give off a first optical signal at a first time (or during a first duration of time) prior to giving off a second optical signal (at least generally different in wavelength from the first optical signal) at a second time (or during a second duration of time). In other words, the health check system of this fifth aspect may be configured in any appropriate manner that enables the health check system to mimic a successful/appropriate engine ignition with regard in one or both wavelength and timing of the particular ignition. That is, the health check system of this fifth aspect is generally designed to provide the associated ignition detection system with an artificial positive indication of an appropriate engine ignition.

DETAILED DESCRIPTION

The present invention will now be described in relation to the accompanying drawings, which at least assist in illustrating the various pertinent features thereof. The present invention can generally be utilized for the detection of ignition in aircraft/spacecraft engines including the RD-180 engine (manufactured by NPO-Energomash, Russia). By example, the RD-180 engine is generally a two thrust chamber engine. That is, each engine generally has two engine nozzles which emit the plumes (i.e., high-pressure, high-velocity gases) that provide propulsion. The RD-180 generally utilizes a staged combustion cycle which calls for liquid oxygen (LOX) and kerosene as the main propellants. In addition, the RD-180 generally utilizes a hypergol/LOX ignition.

Figure 1:
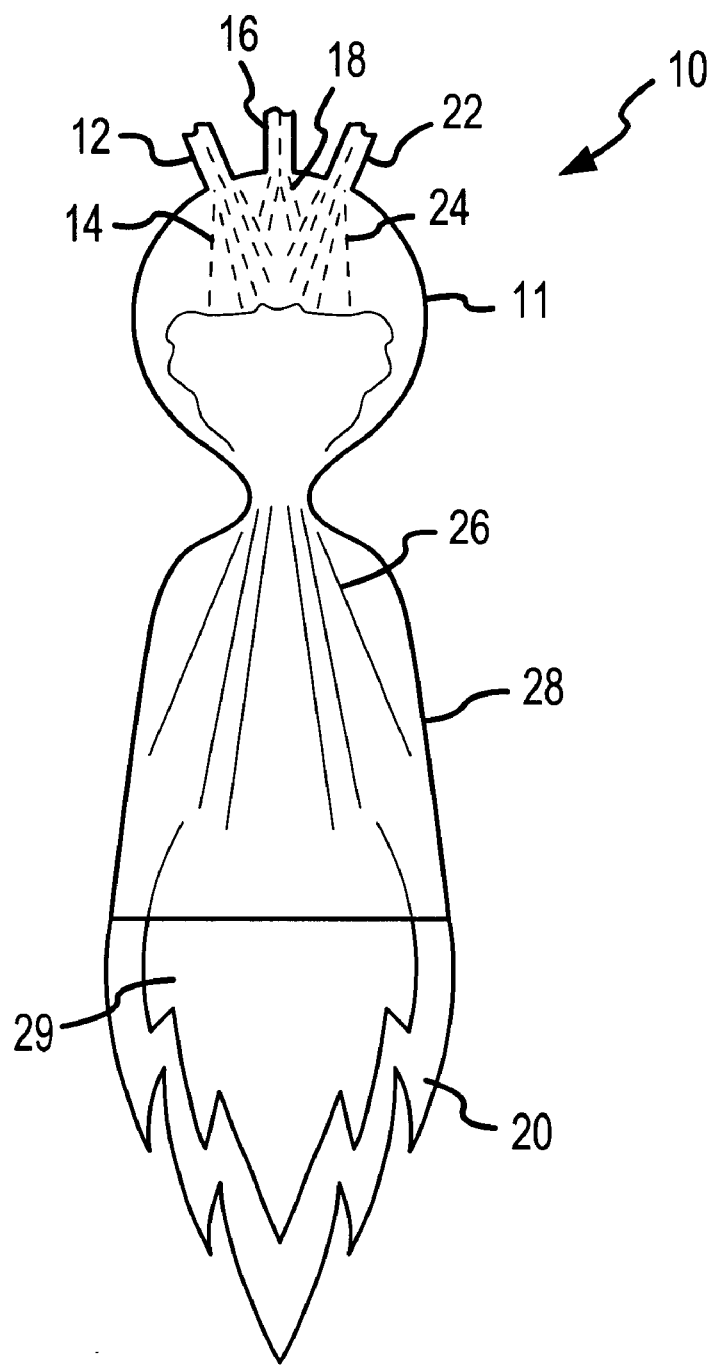
FIG. 1 is a schematic representation of one embodiment of an engine ignition during operation and in side view.

A simplified description of how an exemplary rocket engine works is illustrated in FIG. 1. As a general overview, in most liquid propellant rocket engines, a fuel (e.g. gasoline, kerosene, hydrogen, hydrazine, and/or the like) and an oxidizer (e.g. liquid oxygen and/or nitrogen tetroxide) are pumped into a combustion chamber. There the fuel(s) and oxidizer burn to create a high-pressure, high-velocity stream of hot gases. These gases flow through an exhaust nozzle and then leave the engine to propel the aircraft/spacecraft. Hereafter, the various embodiments will be described in relation to an RD-180 engine. However, it should be appreciated that the principles of these embodiments may be extended to other engines that may use different fuel/fuel components (e.g., oxidizers).

Referring specifically to the rocket engine 10 of FIG. 1, a hypergolic fuel 14 is released through a first duct 12 into a combustion chamber 11 of the rocket engine 10. As noted above, the hypergolic fuel 14 generally ignites spontaneously upon contact with an oxidizer (compound that spontaneously evolves oxygen). In this regard, generally at or about the same time, liquid oxygen, or "LOX," (a well known and potent oxidizer) 18 is released through a second duct 16 into the combustion chamber 11 so that the hypergolic fuel 14 and the LOX 18 interact and spontaneously ignite to form a "pilot light" (not shown). This may be characterized as a first stage of ignition or a first ignition stage. This hypergol/LOX pilot light exhibits generally visible electromagnetic radiation having wavelengths usually between about 200 nm and about 1000 nm. While this hypergol/LOX pilot light exhibits visible electromagnetic radiation, such a pilot light's combustion products do not radiate a significant amount (if any) electromagnetic radiation in infrared wavelengths. The electromagnetic spectra indicative of the pilot light can generally be detected in any one of the plume 20, the exhaust nozzle 28, and the combustion chamber 11.

Upon the pilot light being formed or at least at some predetermined time after the release of the hypergolic fuel 14 and LOX 18, a main fuel 24 is released into a third main fuel duct 22 and is directed into the combustion chamber 11 to interact with at least the pilot light. The main fuel 24 is thereby ignited and combusts (which may be characterized as a second stage of ignition or a second ignition stage), resulting in a generally high-pressure, high-velocity stream of hot gases 26 which pass through an exhaust nozzle 28 at velocities that may range from about 5,000 to about 10,000 MPH and define a plume 20. This stream of hot gasses 26 generally provides the force to propel the spacecraft/aircraft. The main fuel 24 is generally kerosene. Other common propellants which can be utilized as the main fuel for rocket engines can include hydrogen, hydrazine, and/or any other appropriate fuel which, upon ignition, can provide enough thrust to propel an aircraft/spacecraft. The LOX/kerosene flame 29 generally produces soot and smoke which generally significantly radiate in the infrared while the hypergol/LOX pilot light generally does not. Accordingly, the LOX/kerosene flame 29 exhibits generally infrared electromagnetic radiation having wavelengths usually between about 700 nm and about 20,000 nm. While the LOX/kerosene flame 29 is illustrated protruding from the exhaust nozzle 28, it should be understood that such a flame 29 can be detected in the exhaust nozzle 28 as well as in the combustion chamber 11 of the rocket engine 10.

Figure 2A:
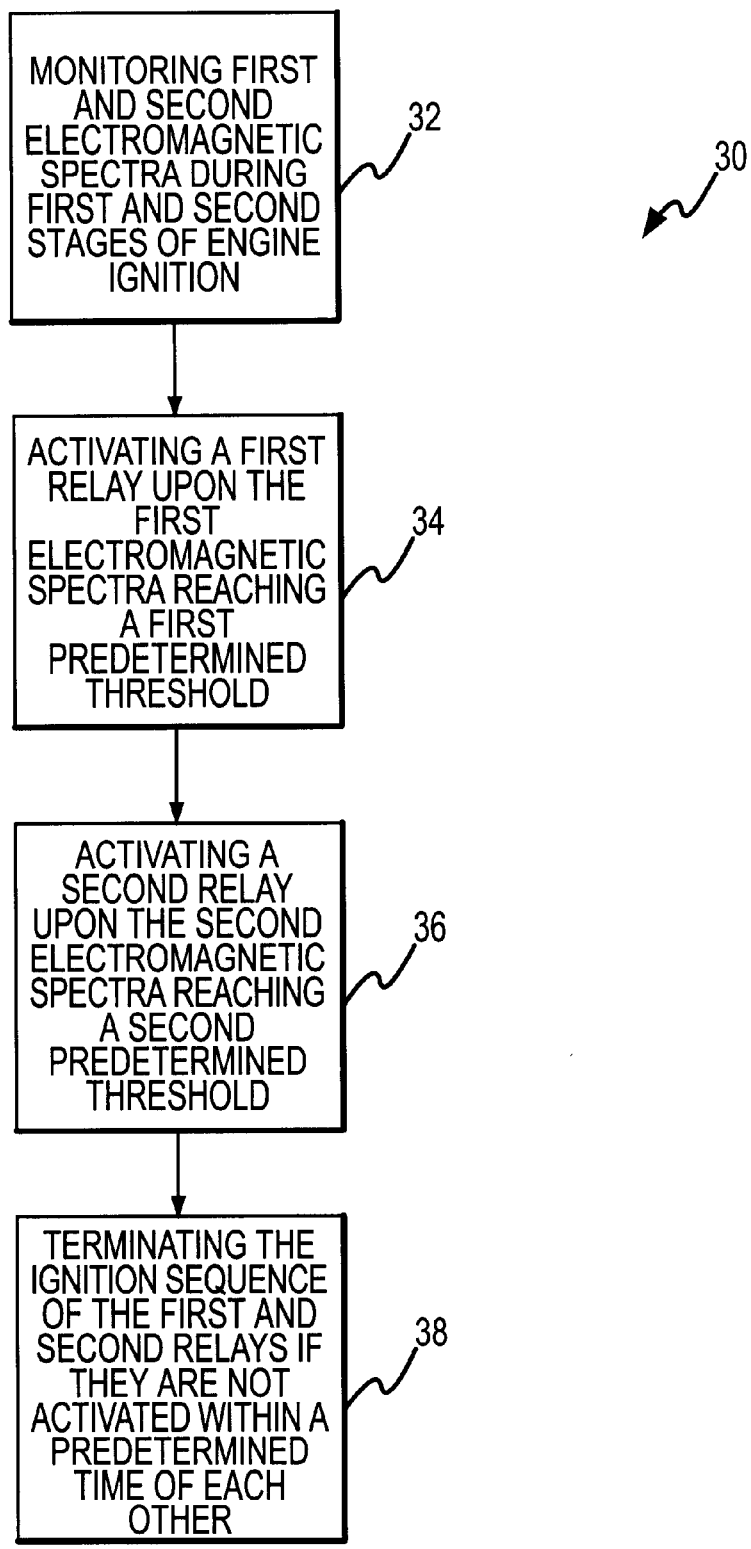
FIG. 2A is a flow chart illustrating one embodiment of an ignition detection protocol.

FIG. 2A illustrates one embodiment of an ignition detection protocol 30 for an engine ignition that includes at least two separate stages in an ignition sequence. For instance and as noted above, the ignition of the hypergolic fuel 14 may be characterized as a first stage, and the ignition of the main fuel 24 may be characterized as a second stage. In an initial step 32, the ignition detection protocol 30 generally includes monitoring first and second ignition stage electromagnetic spectra at least at a time(s) that should correspond with the first and second stages, respectively, of the engine ignition. Typically, both the first and second ignition stage electromagnetic spectra will be monitored at least during desired portions of (and in some instances, the entirety of) the ignition sequence. That is, at least two separate and distinct ranges of electromagnetic radiation are observed. In the protocol 30 of FIG. 2A, ideally, visible light rays make up the first ignition stage electromagnetic spectra, and infrared light rays make up the second ignition stage electromagnetic spectra. Moreover, the first ignition stage electromagnetic spectra preferably include electromagnetic wavelengths within a range of about 400 nm to about 700 nm, and the second ignition stage electromagnetic spectra preferably include electromagnetic wavelengths within a range of about 700 nm to about 20,000 nm. However, single individual wavelengths may be monitored as well (e.g., one wavelength within the visible light spectrum, and another wavelength in the infrared spectrum). Utilizing the engine 10 of the FIG. 1 as an example, the first ignition stage electromagnetic spectra are generally indicative of a hypergol/LOX pilot flame. In other words, the visible wavelengths of electromagnetic spectra emitted by the hypergol/LOX pilot light are generally monitored in this initial step 32 of the ignition detection protocol 30. Similarly, the second ignition stage electromagnetic spectra that are monitored generally include infrared electromagnetic radiation indicative of the LOX/kerosene flame 29.

In a second step 34 of the protocol 30, a first relay can be activated upon the first ignition stage electromagnetic spectra meeting or exceeding a first predetermined threshold. This first predetermined threshold is correlated with an intensity of the first ignition stage electromagnetic spectra which should exist with an acceptable/appropriate burning of the particular fuel being utilized. Continuing with the engine 10 of FIG. 1 as an example, this activation of the first relay usually coincides with detection of a suitable hypergol/LOX pilot light. The first predetermined threshold will typically be specific to the wavelength or wavelength range being monitored (e.g., the first ignition stage electromagnetic spectra), and also may depend upon the makeup of the constituents that are undergoing combustion.

In a third step 36 of the ignition protocol 30 of FIG. 2A, a second relay can be activated upon the second ignition stage electromagnetic spectra meeting or exceeding a second predetermined threshold. As with the first predetermined threshold, the second predetermined threshold is correlated with an intensity of the second ignition stage electromagnetic spectra which should exist with an acceptable/appropriate burning of the particular fuel utilized. Continuing with the exemplary engine 10 of FIG. 1, activation of the second relay generally coincides with detection of a suitable LOX/kerosene flame 29. The second predetermined threshold will typically be specific to the wavelength or wavelength range being monitored (e.g., the second ignition stage electromagnetic spectra), and also may depend upon the makeup of the constituents that are undergoing combustion.

From a diagnostic standpoint, each fuel generally has its own "signature" burn. In other words (and by way of example), kerosene burns at different temperatures (and therefore emits different electromagnetic wavelengths) than gasoline. Thus, utilizing the exemplary engine 10 of FIG. 1, an indication that the first relay was activated and that the second relay was not can suggest that the main fuel 24 is not appropriately reaching the combustion chamber 11. Accordingly, the lift-off/takeoff could be aborted to determine if, for example, the main fuel 24 is being dumped onto the launch pad or if a valve which controls the main fuel supply into the combustion chamber is faulty. By contrast, an indication that the first relay has not been activated can indicate that insufficient amounts of oxidizer 18 are not being released into the combustion chamber 11. In other words, since hypergolic fuel 14 can combust when mixed with air (but the resulting combustion would not be as hot as with LOX), a plume may be observed coming from the exhaust nozzle; however, utilizing the ignition detection protocol 30, the electromagnetic spectra detected will not activate the first relay, as what may appear to the "naked eye" as being a satisfactory flame fails to meet the threshold burn signature required to activate the first relay. Thus, the lift-off/take-off may be aborted to determine if, for example, the oxidizer 18 is leaking or if the valve which controls the supply of oxidizer 18 into the combustion chamber 11 is faulty.

In a fourth step 38 of the ignition protocol 30 of FIG. 2A, if the second relay associated with step 36 is not activated within a predetermined time of the activation of the first relay associated with step 34, the ignition sequence is terminated or aborted. There are a number of ways in which step 38 may be implemented. Step 38 of the protocol 30 may be configured to generate and send a signal to a controller associated with the engine 10 to terminate the ignition sequence if the second relay of step 36 is not activated within a certain predetermined time of the activation of the first relay of step 34. Another option would be for step 38 of the protocol 30 to be configured to generate and send a signal to a controller associated with the engine 10 to proceed with a third stage of the engine ignition sequence upon the first and second relays being activated within a predetermined time of each other. In any case, if steps 34 and 36 of the protocol take place within a set time period of each other, the subject engine/propulsion system will be allowed to proceed to the next phase of lift-off/take-off. In the exemplary engine 10 of FIG. 1, this time period associated with step 38 can range from about 1.15 seconds up to about 1.25 seconds, and is preferably about 1.20 seconds. However, this predetermined time period may vary for different types of engines, different types of fuel mixtures in each of the first and second stages, or both.

Although the steps 34 and 36 have been described in relation to an activation of a corresponding relay, what is of importance is that the second predetermined threshold for the second ignition stage electromagnetic spectra be reached within a predetermined time of the first predetermined threshold for the first ignition stage electromagnetic spectra having been met or exceeded. Any way for implementing this fundamental logic may be utilized by the protocol 30 of FIG. 2A.

Figure 2B:
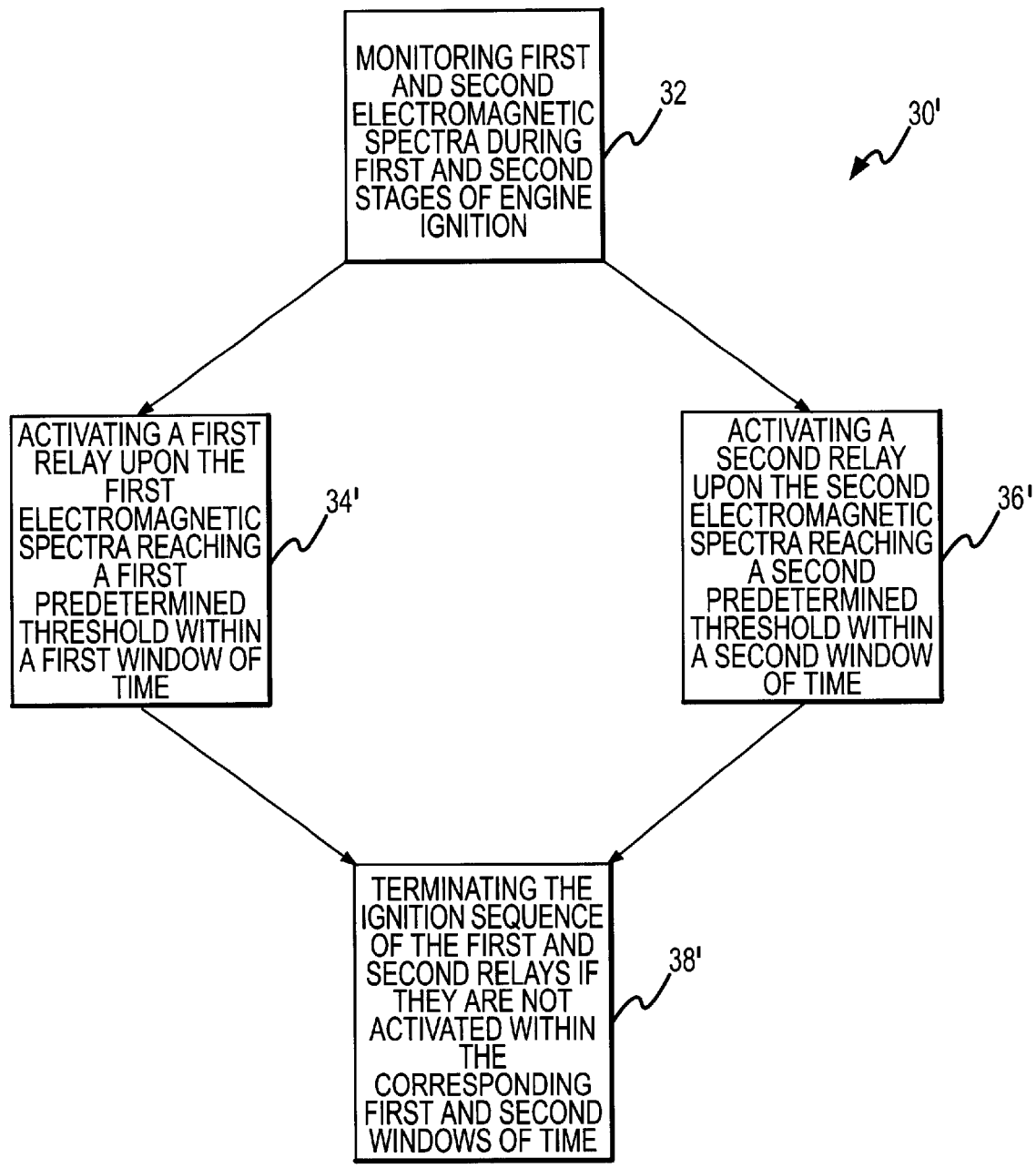
FIG. 2B is a flow chart illustrating another embodiment of an ignition detection protocol.

FIG. 2B illustrates a variation of the ignition detection protocol 30 shown in FIG. 2A, and as such, a "single prime" designation is used to identify the ignition detection protocol 30'. Generally, the difference between the FIG. 2A embodiment and the FIG. 2B embodiment includes the protocol 30' of FIG. 2B having second and third steps 34, 36 respectively that are not directly dependent upon one another. So, for example, the ignition of the hypergolic fuel 14 may be characterized as a first stage, and the ignition of the main fuel 24 may be characterized as a second stage. An initial step 32 of the ignition detection protocol 30', like the first step 32 of FIG. 2A, generally includes monitoring first and second ignition stage electromagnetic spectra at least at a time that should correspond with the first and second stages, respectively, of the engine ignition. Accordingly, the description of the first step 32 of FIG. 2A generally applies to this first step 32 of FIG. 2B as well.

In a second step 34' of the protocol 30', a first relay can be activated upon the first ignition stage electromagnetic spectra reaching a first predetermined threshold within a first window of time (i.e., timeframe) with respect to a designated lift-off/takeoff time (generally referred to as "T–0") of the associated flight vehicle. This first predetermined threshold is correlated with an intensity of the first ignition stage electromagnetic spectra that should exist with an acceptable/appropriate burning of the particular fuel being utilized. Using the engine 10 of FIG. 1 as an example, this activation of the first relay usually coincides with detection of a suitable hypergol/LOX pre-burner during a window of time ranging from about 2.79 seconds up to about 3.40 seconds prior to the designated takeoff/lift-off time (i.e., T–0). The first predetermined threshold will typically be specific to the wavelength or wavelength range being monitored (e.g., the first ignition stage electromagnetic spectra), and also may depend upon the makeup of the constituents that are undergoing combustion.

In a third step 36' of the ignition protocol 30' of FIG. 2B, a second relay can be activated upon the second ignition stage electromagnetic spectra reaching a second predetermined threshold within a second window of time (i.e., timeframe) in relation to the designated lift-off/takeoff time (i.e., T–0). As with the first predetermined threshold of the second step 34', the second predetermined threshold of the third step 36' is correlated with an intensity of the second ignition stage electromagnetic spectra which should exist with an acceptable/appropriate burning of the particular fuel utilized. Again, using the exemplary engine 10 of FIG. 1 as an example, activation of the second relay generally coincides with detection of a suitable LOX/kerosene flame 29 during a window of time ranging from about 1.59 seconds up to about 2.20 seconds prior to the designated takeoff/lift-off time (i.e., T–0). The second predetermined threshold will typically be specific to the wavelength or wavelength range being monitored (e.g., the second ignition stage electromagnetic spectra), and also may depend upon the makeup of the constituents that are undergoing combustion.

In a fourth step 38' of the ignition protocol 30' of FIG. 2B, if the first and/or second relays associated with the respective steps 34', 36' are not activated within the corresponding first and second windows of time in the ignition sequence, the ignition sequence is terminated or aborted. There are a number of ways in which step 38' may be implemented. Step 38' of the protocol 30' may be configured to generate and send a signal to a controller associated with the engine 10 to terminate the ignition sequence if one or both the first and second relays of step(s) 34', 36' are not activated within the corresponding first and second windows of time. Another option would be for step 38' of the protocol 30' to be configured to generate and send a signal to a controller associated with the engine 10 to proceed with a third stage of the engine ignition sequence upon the first and second relays being activated within the associated first and second windows of time. In any case, if steps 34' and 36' of the protocol take place during the respective first and second windows of time, the subject engine/propulsion system will be allowed to proceed to the next phase of lift-off/take-off.

Although the steps 34' and 36' have been described in relation to an activation of a corresponding relay, what is of importance is that the first and second predetermined thresholds be reached within the respective predetermined first and second windows of time (i.e., timeframe). Any way for implementing this fundamental logic may be utilized by the protocol 30' of FIG. 2B.

Figure 3:
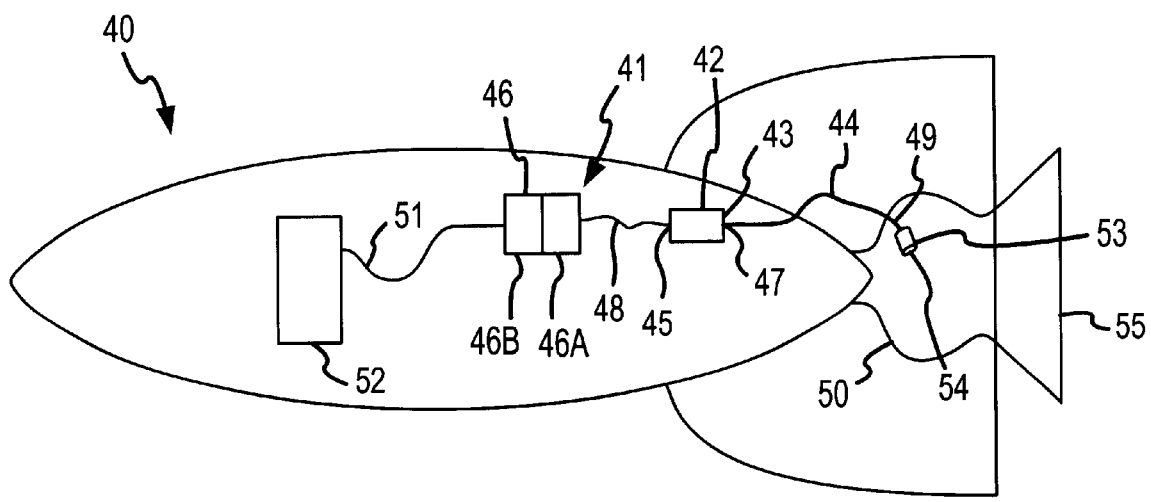
FIG. 3 is a schematic, plan view of one embodiment of an ignition detection system that is attached to an aircraft/spacecraft.

FIG. 3 is a diagram of an ignition detection system 41 as an integral component of a spacecraft 40. The ignition detection system 41 has a camera assembly 42, a fiber optic input cable 44, a control assembly 46, and a connector cable 48. The camera assembly 42 has an input area 43 for receiving spectral data from the fiber optic input cable 44, and an output area 45 connected to the connector cable 48 for sending spectral data collected by one or both the fiber optic input cable 44 and the camera assembly 42 to the control assembly 46. The fiber optic input cable 44 has an attachment end 47 optically connected to the input area 43 of the camera assembly 42 and a hot end 49 disposed opposite the attachment end 47. Herein, "optically connected" generally refers to a condition in which light, spectral data, or the like, is able to travel via a conduit, wire, cable, cord, or duct from a first locus to a second locus. The hot end 49 of the fiber optic input cable 44 is disposed within the combustion chamber 50 of the spacecraft 40. While the hot end 49 of the fiber optic input cable 44 is illustrated within the combustion chamber 50, other variational embodiments of the ignition detection system of FIG. 3 exhibit the hot end 49 of the fiber optic input cable 44 being disposed within the exhaust nozzle 55 as well as in the exhaust plume (not shown) of the spacecraft 40.

As shown in FIG. 3, the hot end 49 of the fiber optic input cable 44 is positioned within the combustion chamber 50 of the spacecraft 40. A portion of the hot end 49 of the fiber optic input cable 44 is generally confined in a protective housing 53. This protective housing 53 is usually shaped as a receptacle having a window 54. The window 54 of the protective housing 53 is designed and configured to enable electromagnetic spectra to reach the hot end 49 of the fiber optic input cable 44 so that the spectral data indicative of the ignition occurring in the combustion chamber 50 can be relayed along the fiber optic input cable 44 to the camera assembly 42 and ultimately onto the control assembly 46. Appropriate materials for the composition of the protective housing 53 include steel, alloys of nickel and chromium such as Inconel® and Incoloy® (both manufactured by Special Metals Welding Products Company of Newton, N.C.), and/or any other material capable of protecting the hot end 49 of the fiber optic input cable 44. In addition, the window 54 is preferably made from glass, quartz, sapphire, zirconia, and/or any other appropriate material which would not significantly inhibit the collection of spectral data by the hot end 49 of the fiber optic input cable 44.

Once the spectral data is collected/taken in by the fiber optic input cable 44, the spectral data is generally conveyed via the fiber optic input cable 44 to the camera assembly 42. The fiber optic input cable 44 utilized in FIG. 3 is generally coated with steel, Inconel®, Incoloy®, and/or any other appropriate material capable of promoting the structural integrity of the fiber optic input cable 44. In other words, the fiber optic input cable 44 can be treated so that it is "ruggedized", "armored", or protected using any other appropriate process. The camera assembly 42 at least generally assists in detecting appropriate/pertinent wavelengths of electromagnetic spectra indicative of the ignition (not shown) in the combustion chamber 50. To accomplish this, the camera assembly 42 generally has at least one camera (e.g., a radiometer or spectrometer) capable of collecting appropriate spectral data. In addition, this camera assembly 42 generally converts the collected photonic spectral data into corresponding electronic signals to be utilized by the ignition detection system 41. The collection and/or detection of this spectral data may be enhanced through the use of one or more of (but not limited to) a filter which substantially allows only specified predetermined wavelengths of electromagnetic spectra to pass through the filter, a focusing optic which at least partially condenses the electromagnetic spectral data, and/or a signal amplifier for intensifying electrical signals indicative of the electromagnetic spectral data.

Upon pertinent spectral data reaching the output area 45 of the camera assembly 42, the spectral data (in the form of an electrical signal(s)) is conveyed along the connector cable 48 to the control assembly 46. The connector cable 48 used in FIG. 3 may be any appropriate cable capable of contacting electrical signals such as insulated metallic (e.g., copper) wiring. As with the fiber optic input cable 44, the connector cable 48 may be coated with steel, Inconel®, Incoloy®, or any other appropriate material capable of protecting the connector cable 48, for example, from the heat of the engine ignition. Thus, this connector cable 48 may also be "ruggedized", "armored", or the like.

The control assembly 46 of the ignition detection system 41 includes a dual setpoint controller 46A and a programmable logic controller 46B. The dual setpoint controller 46A of the control assembly 46 is generally programmed with first and second thresholds (usually first and second voltages, respectively) associated with the respective first and second ignition stage electromagnetic spectra. In the ignition detection system 41 of FIG. 3, the first ignition stage electromagnetic spectra generally include visible wavelengths, and the second ignition stage electromagnetic spectra include infrared wavelengths. The programmable logic controller 46B of the control assembly 46 is generally programmed with a first time threshold corresponding to an acceptable time parameter in which the dual setpoint controller 46A of the control assembly 46 should detect that at least one of the first and second predetermined thresholds is reached. This first time threshold may be indicative of a time duration between the camera assembly 42 conveying spectral data indicative of reaching the first predetermined threshold to the dual setpoint controller 46A of the control assembly 46 and the camera assembly 42 conveying spectral data indicative of reaching the second predetermined threshold to the dual setpoint controller 46A of the control assembly 46. Alternatively, this first time threshold may include a first window of time prior to liftoff/takeoff (i.e., T–0) of the spacecraft 40 in which the first predetermined threshold should be reached. Additionally, this first time threshold may include a second window of time prior to lift-off/takeoff (i.e., T–0) of the spacecraft 40 in which the second predetermined threshold should be reached.

In the spacecraft 40 of FIG. 3, the programmable logic controller 46B and the dual setpoint controller 46A of the control assembly 46 are electrically interconnected (i.e., data in the form of electrical signals can be passed between them) with one another. Further, this control assembly 46 (generally the programmable logic controller 46B) is operatively connected to the spacecraft 40 to provide an electrical control signal to the spacecraft 40. In other words, a connection 51 communicatively interconnects the control assembly 46 of the ignition detection system 41 with the control center 52 of the spacecraft 40. Herein, "communicatively interconnects" generally refers to a condition which enables at least an electrical signal to be conveyed between first and second locations. So for example, the embodiment of FIG. 3 may convey "go" and/or "abort" signals (via the connection 51) between the control assembly 46 and the control center 52. As an alternative example, the control center 52 may be a telemetry center that may communicate (e.g., via radio waves) with a ground-based control station (not shown) to convey "go" and/or "abort" signals between the ground-based control station and the control assembly 46.

Figure 4:
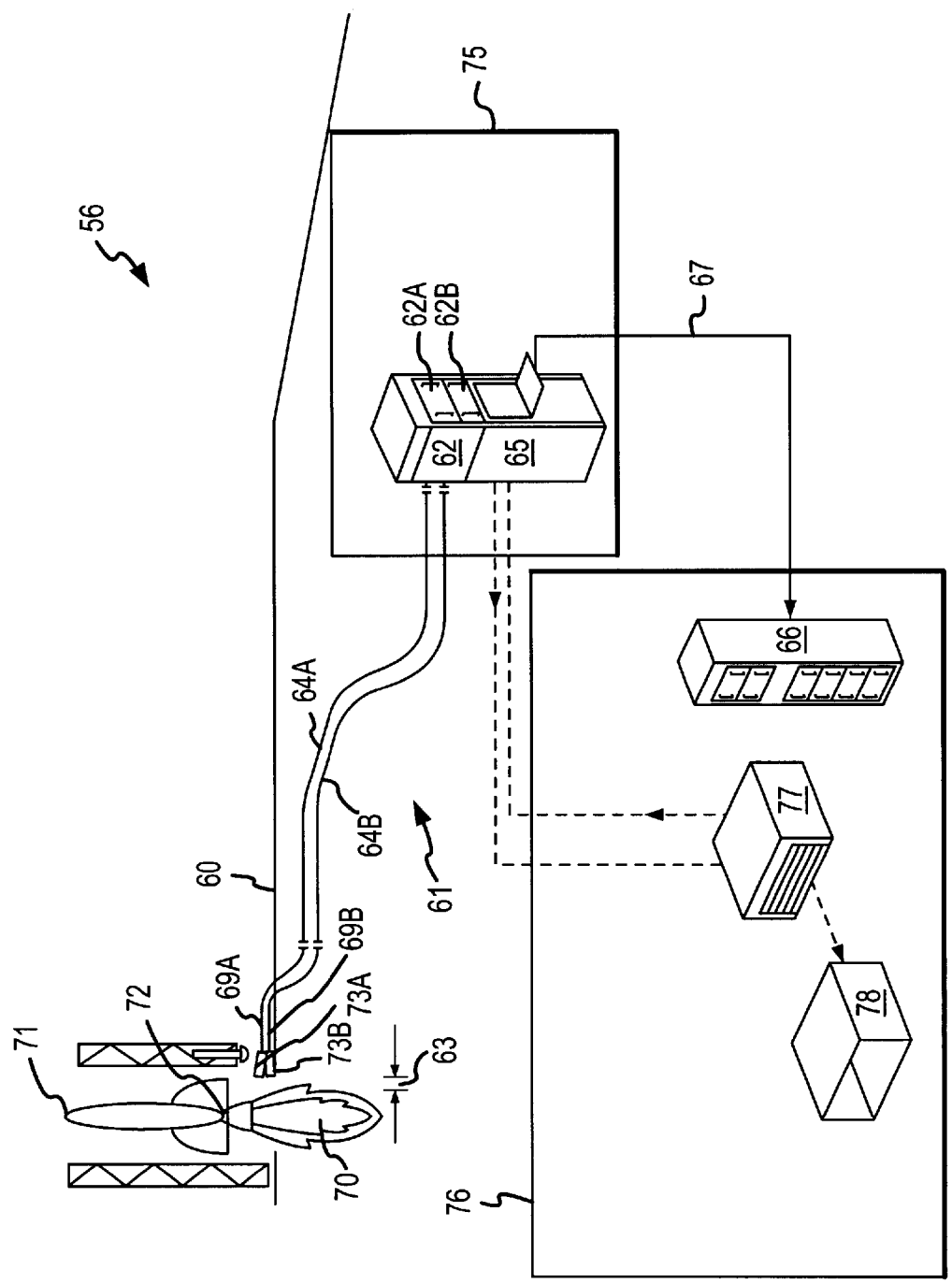
FIG. 4 is a schematic, plan view of one embodiment an ignition detection system that is mounted on a launch pad.

FIG. 4 is a diagram of a launch system 56 having a launch vehicle 71 that includes n engine 72, and an ignition detection system 61 that is attached to a launch pad 60. The ignition detection system 61 has first and second fiber optic input cables 64A, 64B, a camera assembly 62, a dual setpoint controller 65, and a programmable logic controller 66. One of the main differences in the ignition detection systems of FIGS. 3 and 4 is that, in FIG. 4, both the camera assembly 62 and the fiber optic input cables 64A, 64B are free from direct contact with the launch vehicle 71. That is, the camera assembly 62 and the fiber optic input cables 64A, 64B are separate, distinct, and avoid interfacing with any portion of the launch vehicle 71, and more particularly the engine 72.

The camera assembly 62 of FIG. 4 is made up of first and second cameras 62A, 62B which are communicatively interconnected with respective fiber optic input cables 64A, 64B. In other words, each of the cameras 62A, 62B is connected with the respective fiber optic input cable 64A, 64B in such a manner as to allow spectral data (generally in the form of photons) indicative of the radiant energy emitted in an exhaust plume 70 of the launch vehicle 71 to be garnered and conveyed to the respective first or second camera 62A, 62B. Generally, these cameras 62A, 62B may be any appropriate camera (e.g., radiometers and/or spectrometers) capable of collecting optical data in the form of photons and converting such optical data to corresponding electrical signals. By way of example, an appropriate camera capable of being utilized as one or both cameras 62A, 62B in the ignition detection system 61 of FIG. 4 would be the IgDet Camera manufactured by Lockheed Martin Corporation of Bethesda, Md., or a sampling power meter manufactured by RIFOCS Corporation of Camarillo, Calif.

Each of the fiber optic input cables 64A, 64B has a respective hot end 69A, 69B positioned within an optically effective distance of the exhaust plume 70 of the launch vehicle 71. In other words, these hot ends 69A, 69B are positioned on the launch pad 60 such that they are separated from the exhaust plume 70 by a distance 63 which still enables detection of electromagnetic spectra representative of the spacecraft engine ignition. This distance 63 can generally range from about 0.0 feet (i.e., directly in the exhaust plume 70) to about 10 feet away from the exhaust plume 70. Optically effective distances outside this range may be appropriate; for instance, under conditions in which the camera assembly 62 is not able to inadvertently detect other sources of electromagnetic spectra (e.g., the sun rising over the horizon during launch protocols, or spectral data from the plumes of other engines associated with the spacecraft). A portion of each of the hot ends 69A, 69B of the respective fiber optic input cables 64A, 64B is generally confined in a respective protective housing 73A, 73B. These protective housings 73A, 73B generally comply with the material and functional descriptions of the protective housing 53 of FIG. 3. While the ignition detection system 61 of FIG. 4 is illustrated as having first and second fiber optic input cables 64A, 64B, some embodiments of FIG. 4 do not utilize fiber optic input cables; in such embodiments, the camera assembly 62 itself may be positioned within an optically effective distance of the exhaust plume 70 of the launch vehicle 71.

As previously stated, the hot end(s) (e.g., 69) of some embodiments of the invention may be positioned such that it (they) are separated from the exhaust plume by potentially very short distances. Accordingly, even though the associated fiber optic input cable(s) (e.g., 64) may be coated in stainless steel or some other protective coating, the intense heat associated with the plume (e.g., 70) may damage a portion of the fiber optic input cable(s) disposed in close proximity to the plume subsequent to the fiber optic input cable(s) being utilized for detecting an appropriate ignition of the engine (e.g., 72). Thus, while some ignition detection systems (e.g., 61) of the invention may be said to be reusable, merely the associated fiber optic input cable(s) (or at least a portion thereof) may require repair and/or replacement after use. This of course is not always the case and may depend on a variety of factors including, but not limited to, the distance 63 of separation between the hot end of the fiber optic input cable and the plume, the type of fuel utilized (i.e., amount of heat produced by its oxidation), and the coating/ armoring utilized to protect the fiber optic input cable(s).

As described above, the spectral data indicative of radiant energy (i.e., photons) emitted by the exhaust plume 70 is generally collected/taken in by the fiber optic input cables 64A, and 64B. This spectral data is generally conveyed via the fiber optic input cables 64A, 64B to the camera assembly 62. As with the fiber optic input cable 44 of FIG. 3, the fiber optic input cables 64A, 64B are generally coated with steel, Inconel®, Incoloy®, or any other appropriate material capable of promoting the structural integrity of the fiber optic input cables 64A, 64B. In other words, the fiber optic input cables 64A, 64B can be treated so that they are "ruggedized", "armored", or the like to at least assist in resisting (i.e., protecting against) the temperatures to which the fiber optic input cables 64A, 64B are exposed.

As previously mentioned, the camera assembly 62 at least generally assists in garnering appropriate/pertinent wavelengths of electromagnetic spectra indicative of the engine ignition. To accomplish this, the camera assembly 62 is equipped with first and second cameras 62A, 62B. One or both of these cameras 62A, 62B may include one or more of (but not limited to) a filter which substantially allows only specified predetermined wavelengths of electromagnetic spectra to pass through the filter, a focusing optic which at least partially condenses the electromagnetic spectral data, a signal detector for converting the electromagnetic photons to electrons, and/or a signal amplifier for intensifying the resultant electrical signal(s) indicative of the collected electromagnetic spectral data. In the ignition detection system 61 of FIG. 4, the first camera 62A is generally equipped to detect visible wavelengths, to filter out, or be insensitive to wavelengths which do not correspond to visible light, and to convert such detected visible wavelengths into electrical signals indicative of these detected visible wavelengths. Similarly, the second camera 62B is generally equipped to detect infrared wavelengths, to filter out, or be insensitive to electromagnetic spectra which do not correspond to infrared radiation, and to convert such detected infrared wavelengths into electrical signals indicative of these detected infrared wavelengths. Each of these cameras 62A, 62B may monitor a single wavelength or a range of wavelengths.

These electrical signals (from the camera assembly 62) corresponding to the detected spectral data are conveyed to the dual setpoint controller 65, which is generally electrically interconnected with the camera assembly 62 via an appropriate electrical connection such as one or more copper wires (not shown). This dual setpoint controller 65 is generally programmed with a first predetermined threshold associated with visible electromagnetic spectra. Accordingly, spectral data collected and conveyed through the first camera 62A of the camera assembly 62 is analyzed using the dual setpoint controller 65 to determine if such spectral data reaches the first threshold (e.g., a first threshold voltage). This first predetermined threshold of visible electromagnetic spectra may be about 1,000 arbitrary power units above background for combustion resulting from the mixture of hypergolic fuel and LOX. Similarly, the dual setpoint controller 65 is generally programmed with a second predetermined threshold (e.g., a second threshold voltage) associated with infrared electromagnetic spectra. Accordingly, spectral data collected and conveyed through the second camera 62B of the camera assembly 62 is analyzed using the dual setpoint controller 65 to determine if such spectral data reaches the second predetermined threshold. This second predetermined threshold of infrared electromagnetic spectra may be about 1,000 arbitrary power units above background for combustion of kerosene and LOX. While the dual setpoint controller 65 and the camera assembly 62 are illustrated as being located within a transfer room 75 of the launch system 56, the dual setpoint controller 65 and/or the camera assembly 62 may be located at any other position (with respect to the launch vehicle 71) in which the functions of the dual setpoint controller 65 and/or the camera assembly 62 may still be accomplished. By way of example, an appropriate dual setpoint controller capable of being utilized as the dual setpoint controller 65 in the ignition detection system 61 of FIG. 4 would be a commercial process control amplifier with dual threshold capability manufactured by Omega Engineering, Inc., of Stamford, Conn.

The programmable logic controller 66 of FIG. 4 is operatively interconnected with the dual setpoint controller 65 via an appropriate electrical connection 67 (e.g., an electrically insulated metallic wire). This programmable logic controller 66 of FIG. 4 is generally programmed with a first time threshold corresponding to an acceptable time parameter in which the dual setpoint controller 65 should detect that at least one of the first and second predetermined thresholds is reached. This first time threshold may be indicative of a time duration between the camera assembly 62 conveying spectral data indicative of reaching the first predetermined threshold to the dual setpoint controller 65 and the camera assembly 62 conveying spectral data indicative of reaching the second predetermined threshold to the dual setpoint controller 65. The time duration for the embodiment shown in FIG. 4 is generally less than about 1.81 seconds. Alternatively, this first time threshold may include a first window of time prior to lift-off/takeoff (i.e., T–0) of the launch vehicle 71 in which the first predetermined threshold should be reached. Additionally, this first time threshold may include a second window of time prior to lift-off/takeoff (i.e., T–0) of the launch vehicle 71 in which the second predetermined threshold should be reached. With regard to the embodiment shown in FIG. 4, this first window of time is generally about 2.79 seconds up to about 3.40 seconds prior to lift-off/take-off (i.e., T–0), and this second window of time is generally about 1.59 seconds up to about 2.20 seconds prior to lift-off/take-off (i.e., T–0). By way of example, an appropriate programmable logic controller capable of being utilized as the programmable logic controller 66 in the ignition detection system 61 of FIG. 4 would be the Programmable Logic Controller manufactured by August Systems Limited of Houston, Tex. While the programmable logic controller 66 of FIG. 4 is illustrated as being located in a blockhouse 76, other embodiments of the ignition detection system 61 of FIG. 4 include the programmable logic controller 66 being in a variety of appropriate locations such as, but not limited to, a transfer room or on the launch pad 60. In addition, various other optional components may be added to the ignition detect system 61 of FIG. 4, such as a multiplexer apparatus 77 which may be interconnected with the dual setpoint controller 65 and which generally receives a plurality of signals from a variety of sources (e.g., the camera assembly 62 and/or the dual setpoint controller 65) and interleaves the signals and sends the signals to the appropriate locations (e.g., a data management system, the camera assembly 62 and/or the dual setpoint controller 65). Another component that may be added to the ignition detection system 61 of FIG. 4 is an automatic data management system 78 which may be interconnected with the multiplexer apparatus 77 and generally functions to record at least the spectral data collected during a launch protocol so that the data can be analyzed/reviewed at a later time. Further, a communicative connection (not shown) may exist between the launch vehicle 71 and the programmable logic controller 66 to provide control signals to the launch vehicle 71. In other words, this communicative connection can enable the programmable logic controller 66 to convey operations signals (such as "go" and/or "abort" signals) to the launch vehicle 71.

Figure 5:
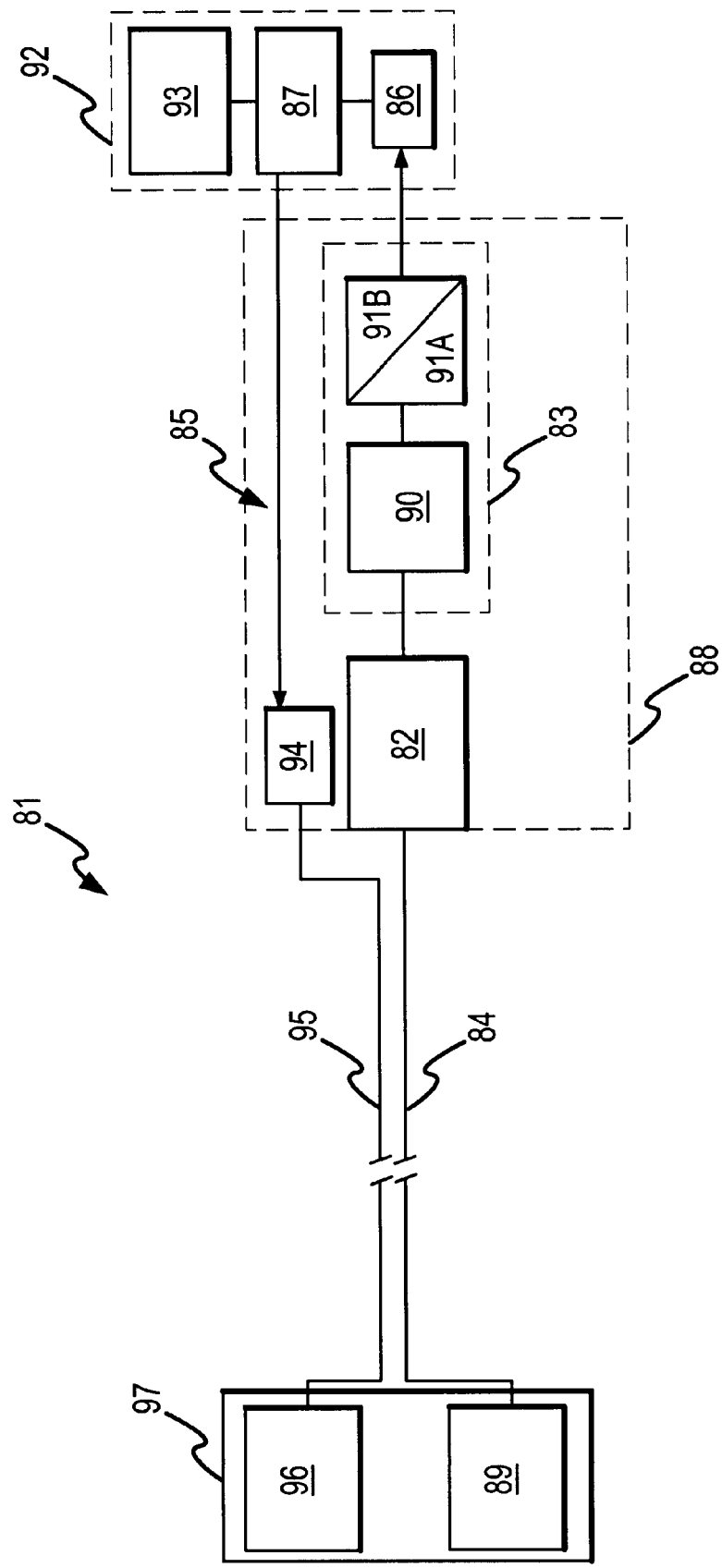
FIG. 5 is a schematic, plan view of one embodiment of an ignition detection system having a health check system.

FIG. 5 illustrates an ignition detection system 81 having a camera assembly 82 (including one or more of the cameras discussed above) interconnected with a fiber optic input cable 84 that has a hot end 89 that may generally be positioned within an optically effective distance (see FIG. 4) of the combusting propellant(s) when in use. As in FIG. 4, this camera assembly 82 is generally positioned within a transfer room 88 along with a dual setpoint controller 83 that is electrically interconnected with the camera assembly 82. This dual setpoint controller 83 includes a threshold amplifier(s) 90 that generally functions to intensify/magnify electrical signals sent from the camera assembly 82 that are indicative of spectral data that meets or exceeds the first and/or second predetermined thresholds (i.e., first and/or second predetermined voltages). In addition, this dual setpoint controller 83 also includes first and second relays 91A, 91B that are generally activated (i.e., automatically switched from open to closed) in response to detecting electrical signals indicative of electromagnetic spectra that meets and/or exceeds the first and/or second thresholds. Once one or both the first and second relays 91A, 91B are activated, the dual setpoint controller 83 generally sends electrical signal(s) to the programmable logic controller 86 found in the blockhouse 92 of the ignition detection system 81. As with the programmable logic controller 66 of FIG. 4, the programmable logic controller 86 may be electrically interconnected with one or more optional ignition detection components 93, such as (but not limited to) an automatic data management system (e.g., 78 of FIG. 4) and/or a multiplexer apparatus (e.g., 77 of FIG. 4).

The ignition detection system 81 of FIG. 5 also has a health check system 85 for determining the ability of the associated ignition detection system 81 to appropriately detect desired electromagnetic spectral data and subsequently activate the appropriate relay(s) in response to receiving electrical signals indicative of such electromagnetic spectral data. This health check system 85 generally includes a health check panel 87 that is electrically interconnected with test lamp(s) 94. In addition, the health check system 85 also includes at least one test fiber optic cable 95 that is optically interconnected with the test lamp(s) 94 and that has a hot end 96 opposite the end that is optically interconnected with the test lamp(s) 94. The hot end(s) of the test fiber optic cable(s) is located within a protective housing 97 such as the protective housing 73 of FIG. 4 and/or the protective housing 53 of FIG. 3.

Figure 6:
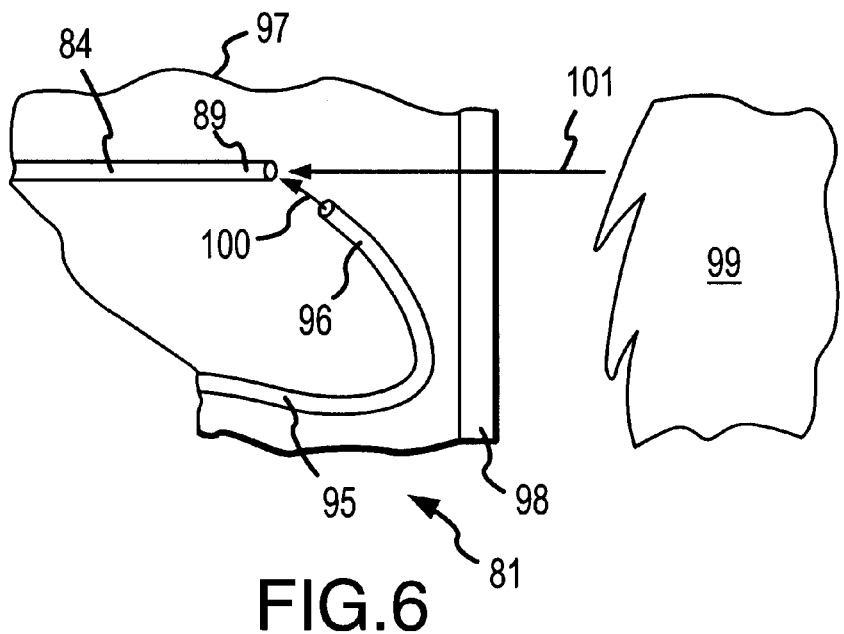
FIG. 6 is a side view of a portion of the ignition detection system of FIG. 5 illustrating one orientation of the associated cables within the protective housing.

The health check system 85 of FIG. 5 generally functions by issuing an electrical signal from the health check panel 87 to the test lamp(s) 94. In response to receiving this electrical signal, the test lamp(s) 94 issues an optical test signal (i.e., the lamp lights up) that travels away from the test lamp(s) 94 toward the hot end 96 of the test fiber optic cable(s) 95. Referring to FIG. 6, once the optical test signal reaches the hot end 96 of the test fiber optic cable 95, the optical test signal (i.e., light) is emitted from the hot end 96 of the test fiber optic cable 95 in a direction indicated by arrow 100 (i.e., at least generally toward the hot end 89 of the fiber optic input cable 84). In other words, the test lamp 94 emits a diagnostic test light that passes through the test fiber optic cable 95 and that is released from the hot end 96 of the test fiber optic cable 95. A flame 99 is included in FIG. 6 to illustrate that the test fiber optic cable 95 is oriented in the protective housing 97 in such a manner as to avoid preventing a significant amount of photons/electromagnetic spectra from reaching the hot end 89 of the fiber optic input cable 84. In other words, the hot end 96 of the test fiber optic cable 95 is positioned within the protective housing 97 in a manner which enables photons to travel at least in the general direction indicated by arrow 101 through a window 98 of the protective housing 97 to the hot end 89 of the fiber optic input cable 84.

Referring back to FIG. 5, once the hot end 89 of the fiber optic input cable 84 has received the photons/electromagnetic spectra from the test lamp 94, ignition detection system 81 should determine that one of the above-described first or second predetermined thresholds has been reached. In other words, if the ignition detection system 81 is working properly, the optical input cable 84 will convey the optical spectral data of the test lamp 94 to the camera assembly 82, which, amongst other functions, generally converts the optical data to one or more electrical signals. These electrical signals are then sent along an appropriate electrical connection (e.g., copper wire) to the dual setpoint controller 83, wherein one of the relays 91A, 91B should be activated, and a subsequent signal should be sent to the programmable logic controller 86. Conversely, if the ignition detection system 81 is not working properly, optical data and/or electrical signals indicative of the optical data either will not reach the desired locations of the ignition detection system 81, or will not activate the dual setpoint controller relays (indicating that the dual setpoint controller's threshold amplifiers' settings may have drifted from their setpoint). Accordingly, an operator/technician is able to determine a defect in the system 81. While the health check panel 87 is illustrated as being within the blockhouse 92, other embodiments of the ignition detection system 81 of FIG. 5 may have the health check panel 87 being a separate component which may or may not be communicatively connected with the programmable logic controller 86. In such embodiments, the test lamp(s) 94 also may not be interconnected with the programmable logic controller 86, but is generally appropriately interconnected with the health check panel 87 to provide for the diagnostic testing described herein.

Figure 7:
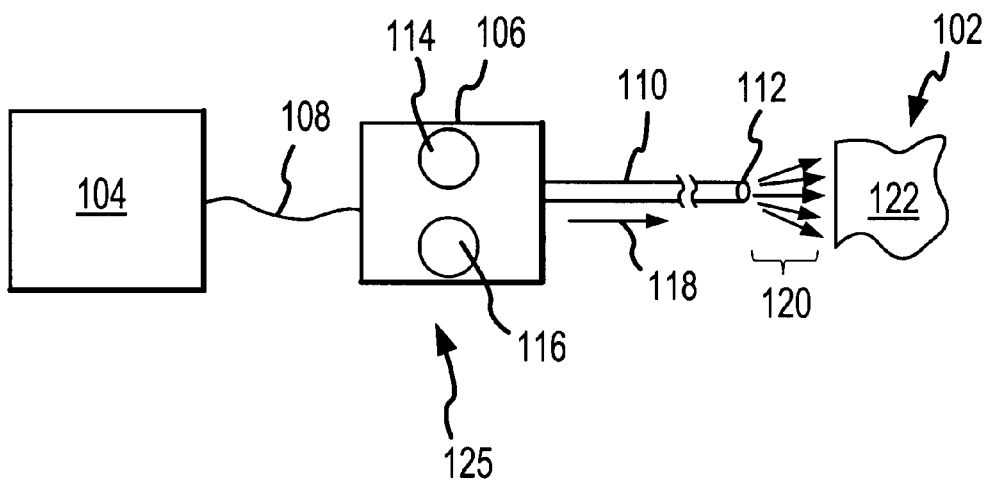
FIG. 7 is a schematic representation of one embodiment of a health check system for use with ignition detection systems.

FIG. 7 illustrates a health check system 125 for determining if an associated ignition detection system 102 functions appropriately. While the health check system 85 of FIG. 5 is shown as being an integral component of the ignition detection system 81, the health check system 125 of FIG. 7 is separate and distinct from the associated ignition detection system 102. The health check system 125 generally includes a health check panel 104 that is electrically interconnected with a test lamp assembly 106 via a wire 108 that is capable of conducting electrical signals. This test lamp assembly generally includes first and second lamps 114, 116, respectively. In addition, the health check system 125 also includes a test fiber optic cable 110 that is optically interconnected with the test lamp assembly 106 and that has a hot end 112 opposite the end that is optically interconnected with the test lamp assembly 106.

The health check system 125 of FIG. 7 generally functions by issuing one or more electrical signal(s) from the health check panel 104 to the test lamp assembly 106 via the wire 108. In response to receiving the electrical signal(s), the test lamp assembly 106 issues one or more optical test signals (i.e., (a) lights) that travel away from the test lamp assembly 106 toward the hot end 112 of the test fiber optic cable 110. In other words, the optical test signal(s) generally conveyed via the test fiber optic cable 110 in the direction generally indicated by arrow 118. With regard to these optical test signals, the first lamp 114 of the test lamp assembly 106 generally emits (i.e., gives off) electromagnetic spectra within a desired first range that is to be detected by the ignition detection system 102. So, using FIG. 4 as an example, if it is desired to test the health of the ignition detection system 61 of the launch system 56, the first lamp 114 will emit electromagnetic spectra that reach the first predetermined threshold. Similarly, the second lamp 116 of the test lamp assembly 106 generally emits electromagnetic spectra within a desired second range that is to be detected by the ignition detection system 102. Continuing with using FIG. 4 as an example, the second lamp 116 will generally emit electromagnetic spectra that reach the second predetermined threshold. Which lamp 114, 116 is activated (i.e., "turned on" so that it gives off electromagnetic spectra), as well as when the lamp(s) 114, 116 is activated, is generally controlled using the health check panel 104. So, again using the ignition detection system 61 of FIG. 4 as an example, if only the function of the ignition detection system 61 with regard to the first predetermined threshold is desired to be tested, only the first lamp 114 of the health check system 125 may be activated. Likewise, if only the faction of the ignition detection system 61 with regard to the second predetermined threshold is desired to be tested, only the second lamp 116 of the health check system 125 may be activated. In the instance that is desirable to simultaneously test both the first and second predetermined thresholds of the ignition detection system 61, one or more signals can be sent from the health check panel 104 to the test lamp assembly 106 to simultaneously activated both the first and second lamps 114, 116. In the event that is desirable to test the first and second predetermined thresholds with regard to timing (e.g., one or more time thresholds), the health check panel 104 can be configured to send one or more signals to the test lamp assembly 106 to illuminate one of the first and second lamps 114, 116 a specified time prior to illuminating the other of the first and second lamps 114, 116. In other words, the test lamp assembly 106 may receive one or more signals from the health check panel 104 to activate the first lamp 114 at a specified time prior to and/or after receiving one or more signals from the health check panel 104 to activate the second lamp 116.

Still referring to FIG. 7, once the optical test signal(s) from the test lamp assembly 106 reaches the hot end 112 of the test fiber optic cable 110, the optical test signal(s) (i.e., light) is emitted from the hot end 112 of the test fiber optic cable 110 in a direction at least generally indicated by one or more of arrows 120. In other words, the optical test signal(s) is emitted from the hot end 112 of the test fiber optic cable 110 at least generally toward a photon receiving component 122 of the associated ignition detection system 102. This photon receiving component 122 of the ignition detection system 102 may be any appropriate component for at least assisting in receiving electromagnetic spectra such as (but not limited to) a fiber optic cable (e.g., 44 of FIG. 3), a window (e.g., 54 of FIG. 3) of a protective housing (e.g., 53 of FIG. 3), or a window/input end of a camera (e.g., 43 of FIG. 3).

Although the test lamp assembly 106 of the health check system 125 of FIG. 7 has been described in relation to first and second lamps 114, 116 corresponding to first and second predetermined thresholds of an ignition detection system, what is of importance is that the test lamp assembly 106 be equipped with enough lamps to test the associated ignition detection system for appropriate detection of the desired wavelength(s). Further, if the timing of such detection is required, it is important that the health check system 125 be equipped with a health check panel 104 capable of providing signals to activate/deactivate (i.e., turn on/off) the desired lamps at designated times. Any way for implementing this fundamental logic may be utilized by the health check system 125 of FIG. 7.

It is understood that some flight vehicles (e.g., spacecrafts and/or aircrafts) can have multiple engines. In addition it is understood that some engines can have multiple exhaust nozzles. Accordingly, any appropriate embodiment of the above-described FIGS. 1–7 may be utilized in a manner that exhibits one or more ignition detection systems being positioned in/at/near each corresponding combustion chamber, exhaust nozzle, and/or exhaust plume associated with the spacecraft/aircraft to detect appropriate ignition spectra in each of the same.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

What is claimed is:

1. A method for operating an engine, comprising the steps of:
    initiating an ignition sequence that comprises first and second ignition stages for said engine;
    monitoring first and second ignition stage electromagnetic spectra at least during a time corresponding with said first and second ignition stages, respectively;
    activating a first relay upon said first ignition stage electromagnetic spectra reaching a first predetermined threshold within a first predetermined timeframe of said ignition sequence;
    activating a second relay upon said second ignition stage electromagnetic spectra reaching a second predetermined threshold within a second predetermined timeframe of said ignition sequence; and
    terminating said ignition sequence if at least one of said first and second relays fails to be activated.

2. A method, as claimed in claim 1, wherein said first predetermined timeframe is within a range of 2.79 seconds up to 3.40 seconds prior to a takeoff stage of said ignition sequence.

3. A method, as claimed in claim 1, wherein said second predetermined timeframe is within a range of 1.59 seconds up to 2.20 seconds prior to a takeoff stage of said ignition sequence.

4. A method, as claimed in claim 1, wherein an amount of time elapsed between said activating a first relay step and said activating a second relay step is no more than about 1.81 seconds.

5. A method, as claimed in claim 1, wherein said first ignition stage electromagnetic spectra comprises visible light rays.

6. A method, as claimed in claim 1, wherein said first ignition stage electromagnetic spectra is associated with ignition of at least one of a hypergolic fuel and liquid oxygen.

7. A method, as claimed in claim 1, wherein said first ignition stage electromagnetic spectra comprises a first wavelength range.

8. A method, as claimed in claim 1, wherein said first ignition stage electromagnetic spectra comprises a single, individual wavelength.

9. A method, as claimed in claim 1, wherein said second ignition stage electromagnetic spectra comprises infrared light rays.

10. A method, as claimed in claim 1, wherein said second ignition stage electromagnetic spectra is associated with ignition of at least one of kerosene and liquid oxygen.

11. A method, as claimed in claim 1, wherein said second ignition stage electromagnetic spectra comprises a second wavelength range.

12. A method, as claimed in claim 1, wherein said second ignition stage electromagnetic spectra comprises a single, individual wavelength.

13. A method, as claimed in claim 1, wherein said engine is found in an aircraft selected from the group consisting of airplanes, rockets, missiles, space shuttles, and satellites.

14. A method, as claimed in claim 13, wherein said monitoring step fails to require direct physical contact between ignition detection equipment and said aircraft.

15. A method, as claimed in claim 1, wherein said monitoring step comprises converting an optical signal representative of said first and second ignition stage electromagnetic spectra to first and second electrical signals, respectively.

16. A method, as claimed in claim 15, wherein said converting step comprises amplifying said first and second electrical signals.

17. A method, as claimed in claim 15, wherein said first and second predetermined thresholds are first and second voltages, respectively.

18. A launch system, comprising:
    a launch vehicle that comprises an engine; and
    an ignition detection system comprising:
        a camera assembly comprising an input area and an output area;
        a fiber optic input cable comprising an attachment end optically connected to said input area of said camera assembly and a hot end disposed opposite said attachment end, wherein said hot end is disposed at least within an optically effective distance from said engine, wherein said optically effective distance refers to a distance which allows detection of electromagnetic spectra representative of ignition of said engine, and wherein both said camera assembly and said fiber optic input cable are free from direct contact with said launch vehicle; and
        a control assembly operatively interconnected with said camera assembly, wherein electrical signals indicative of said electromagnetic spectra are able to pass between said control assembly and said camera assembly.

19. A launch system, as claimed in claim 18, wherein said ignition detection system is mounted on a launch pad.

20. A launch system, as claimed in claim 18, wherein said ignition detection system effectively avoids structural damage during said ignition of said engine, and wherein said ignition detection system is reusable for detection of multiple ignitions.

21. A launch system, as claimed in claim 18, wherein said control assembly is programmed with a first predetermined threshold associated with first electromagnetic spectra and a second predetermined threshold associated with second electromagnetic spectra.

22. A launch system, as claimed in claim 21, wherein said control assembly comprises at least one of a programmable logic controller and a dual setpoint controller.

23. A launch system, as claimed in claim 21, wherein said control assembly is programmed with a first predetermined timeframe of a launch sequence in which said first predetermined threshold should be reached.

24. A launch system, as claimed in claim 21, wherein said control assembly is programmed with a second predetermined timeframe of a launch sequence in which said second predetermined threshold should be reached.

25. A launch system, as claimed in claim 21, wherein said control assembly is programmed with a time threshold corresponding to an acceptable time duration between said camera assembly detecting said first predetermined threshold and said second predetermined threshold.

26. A launch system, as claimed in claim 21, wherein said first electromagnetic spectra comprises infrared wavelengths.

27. A launch system, as claimed in claim 21, wherein said first electromagnetic spectra comprises a range of wavelengths or a single, individual wavelength.

28. A launch system, as claimed in claim 21, wherein said second electromagnetic spectra comprises visible wavelengths.

29. A launch system, as claimed in claim 21, wherein said second electromagnetic spectra comprises a range of wavelengths or a single, individual wavelength.

30. A launch system, as claimed in claim 18, wherein a programmable logic controller of said control assembly is operatively connected to said spacecraft to provide a control signal to said spacecraft.

31. A launch system, as claimed in claim 18, wherein said camera assembly comprises at least one camera comprising a filter which substantially allows only specified wavelengths of said electromagnetic spectra to pass through said filter.

32. A launch system, as claimed in claim 18, wherein said camera assembly comprises at least one camera comprising a focusing optic that at least partially condenses said electromagnetic spectra.

33. A launch system, as claimed in claim 18, wherein said camera assembly comprises at least one camera comprising a signal amplifier for amplifying first and second signals corresponding with said first and second electromagnetic spectra, respectively.

34. A launch system, as claimed in claim 18, wherein said camera assembly comprises first and second cameras, wherein said first camera detects infrared light wavelengths, and wherein said second camera detects visual light wavelengths.

35. A launch system, as claimed in claim 34, wherein said fiber optic input cable comprises a first fiber optic operatively interconnected with a first input of said first camera and a second fiber optic operatively interconnected with a second input of said second camera.

36. A launch system, as claimed in claim 18, wherein said hot end of said fiber optic input cable is disposed within an exhaust plume of said engine.

37. A launch system, as claimed in claim 18, wherein said hot end of said fiber optic input cable is disposed within a combustion chamber of said engine.

38. A launch system, as claimed in claim 18, wherein said optically effective distance is no more than about 10 feet.

39. A launch system, as claimed in claim 18, wherein said hot end of said fiber optic input cable is separated from physical contact with said spacecraft by a distance of 2 inches up to 10 feet.

40. A launch system, as claimed in claim 18, wherein said hot end of said fiber optic input cable is confined in a protective housing comprising a steel receptacle and a window, wherein said window of said protective housing enables electromagnetic spectra to reach said hot end of said fiber optic input cable.

41. A launch system, as claimed in claim 40, wherein said window is made of glass, quartz, sapphire, or zirconia.

42. A launch system, as claimed in claim 18, wherein said at least one connector cable comprises at least one fiber optic cable.

43. A launch system comprising:

a launch vehicle that comprises an engine;

a camera assembly for detecting electromagnetic spectra, wherein said camera assembly comprises a fiber optic input cable comprising an attachment end optically connected to said camera assembly and a hot end positioned opposite said attachment end and disposed at least generally toward said engine; and a control assembly operatively interconnected with said camera assembly, wherein said control assembly is programmed with a first predetermined threshold associated with first electromagnetic spectra and a second predetermined threshold associated with second electromagnetic spectra, and wherein said control assembly is further programmed with a first time threshold associated with a first time parameter in which at least one of said first and second predetermined thresholds should be reached.

44. A launch system, as claimed in claim 43, wherein said first electromagnetic spectra comprises a wavelength range of 200 nm up to 700 nm.

45. A launch system, as claimed in claim 43, wherein said first electromagnetic spectra comprises a single, individual wavelength.

46. A launch system, as claimed in claim 43, wherein said second electromagnetic spectra comprises a wavelength range of 700 nm to 300,00 nm.

47. A launch system, as claimed in claim 43, wherein said second electromagnetic spectra comprises a single, individual wavelength.

48. A launch system, as claimed in claim 43, wherein said first time threshold comprises an acceptable time duration between when said first predetermined threshold and said second predetermined threshold should be reached.

49. A launch system, as claimed in claim 48, wherein said acceptable time duration ranges from 100 milliseconds up to 3 seconds.

50. A launch system, as claimed in claim 48, wherein said acceptable time duration is no more than about 10 milliseconds.

51. A method for operating an engine, comprising the steps of:

initiating an ignition sequence that comprises first and second ignition stages for said engine;

monitoring first and second ignition stage electromagnetic spectra at least during a time corresponding with said first and second ignition stages, respectively;

determining if said first ignition stage electromagnetic spectra reaches a first predetermined threshold during said first ignition stage;

determining if said second ignition stage electromagnetic spectra reaches a second predetermined threshold during said second ignition stage; and terminating said ignition sequence if said second predetermined threshold is not reached within a predetermined time of said first predetermined threshold being reached.

* * * * *